(12) United States Patent
Dooling et al.

(10) Patent No.: US 11,742,934 B2
(45) Date of Patent: Aug. 29, 2023

(54) METHOD FOR PREDICTIVE MAINTENANCE OF SATELLITES

(71) Applicant: Resilient Solutions 21, Inc., Albuquerque, NM (US)

(72) Inventors: David Dooling, Albuquerque, NM (US); Michelle Archuleta, Albuquerque, NM (US); Kameron Baumgardner, Albuquerque, NM (US)

(73) Assignee: Resilient Solutions 21, Inc., Albuquerque, NM (US)

( * ) Notice: Subject to any disclaimer, the term of this patent is extended or adjusted under 35 U.S.C. 154(b) by 0 days.

(21) Appl. No.: 18/086,453

(22) Filed: Dec. 21, 2022

(65) Prior Publication Data

US 2023/0130854 A1    Apr. 27, 2023

Related U.S. Application Data

(63) Continuation of application No. 17/738,772, filed on May 6, 2022, now Pat. No. 11,569,905.

(60) Provisional application No. 63/185,847, filed on May 7, 2021.

(51) Int. Cl.
*H04B 7/185* (2006.01)
(52) U.S. Cl.
CPC ................ *H04B 7/18519* (2013.01)
(58) Field of Classification Search
CPC ............................. H04B 7/185–195
See application file for complete search history.

(56) References Cited

U.S. PATENT DOCUMENTS

| | | | | |
|---|---|---|---|---|
| 2012/0112925 | A1* | 5/2012 | You | H04B 7/18519 340/870.05 |
| 2014/0222255 | A1* | 8/2014 | You | B64G 1/24 701/3 |
| 2017/0250751 | A1* | 8/2017 | Kargieman | G06V 10/25 |
| 2019/0391897 | A1* | 12/2019 | Vijendra | G06N 20/00 |

(Continued)

OTHER PUBLICATIONS

Telemetry-mining: A Machine Learning Approach to Anomaly Detection and Fault Diagnosis for Space Systems, 2nd IEEE International Conference on Space Mission Challenges for Information Technology (SMC-IT'06), Yairi et al. (Year: 2006).*

(Continued)

*Primary Examiner* — Raymond S Dean
(74) *Attorney, Agent, or Firm* — Run8 Patent Group, LLC; Peter Miller

(57) ABSTRACT

One variation of a method includes: training a first model to predict failures within the first population of satellites within a first time window based on a first set of historical timeseries telemetry data and a first set of historical timeseries failure data; and training a second model to predict failures within the first population of satellites within a second time window, shorter than the first time window, based on the first set of historical timeseries telemetry data and the first set of historical timeseries failure data. The method further includes: predicting a first probability of failure of the first satellite within the first time window based on the first model and the first set of timeseries telemetry data; and predicting a second probability of failure of the first satellite within the second time window based on the second model and the first set of timeseries telemetry data.

20 Claims, 4 Drawing Sheets

(56) References Cited

U.S. PATENT DOCUMENTS

2021/0344411 A1* 11/2021 Choquette ............ H04B 7/0617
2022/0129791 A1* 4/2022 Nia ..................... G06F 18/2414

OTHER PUBLICATIONS

Machine Learning Techniques for Satellite Fault Diagnosis, Ain Shams Engineering Journal, Ibrahim et al. (Year: 2020).*

* cited by examiner

METHOD FOR PREDICTIVE MAINTENANCE OF SATELLITES

CROSS-REFERENCE TO RELATED APPLICATIONS

This Application is a continuation application of U.S. patent application Ser. No. 17/738,772, filed on 6 May 2022, which claims the benefit of U.S. Provisional Application 63/185,847, filed on 7 May 2022, each of which are incorporated in their entirety by this reference.

TECHNICAL FIELD

This invention relates generally to the field of satellites and more specifically to a new and useful method for predicting safe mode transitions of satellites and managing and/or preventing potential failure events.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First Method

Figure 1:
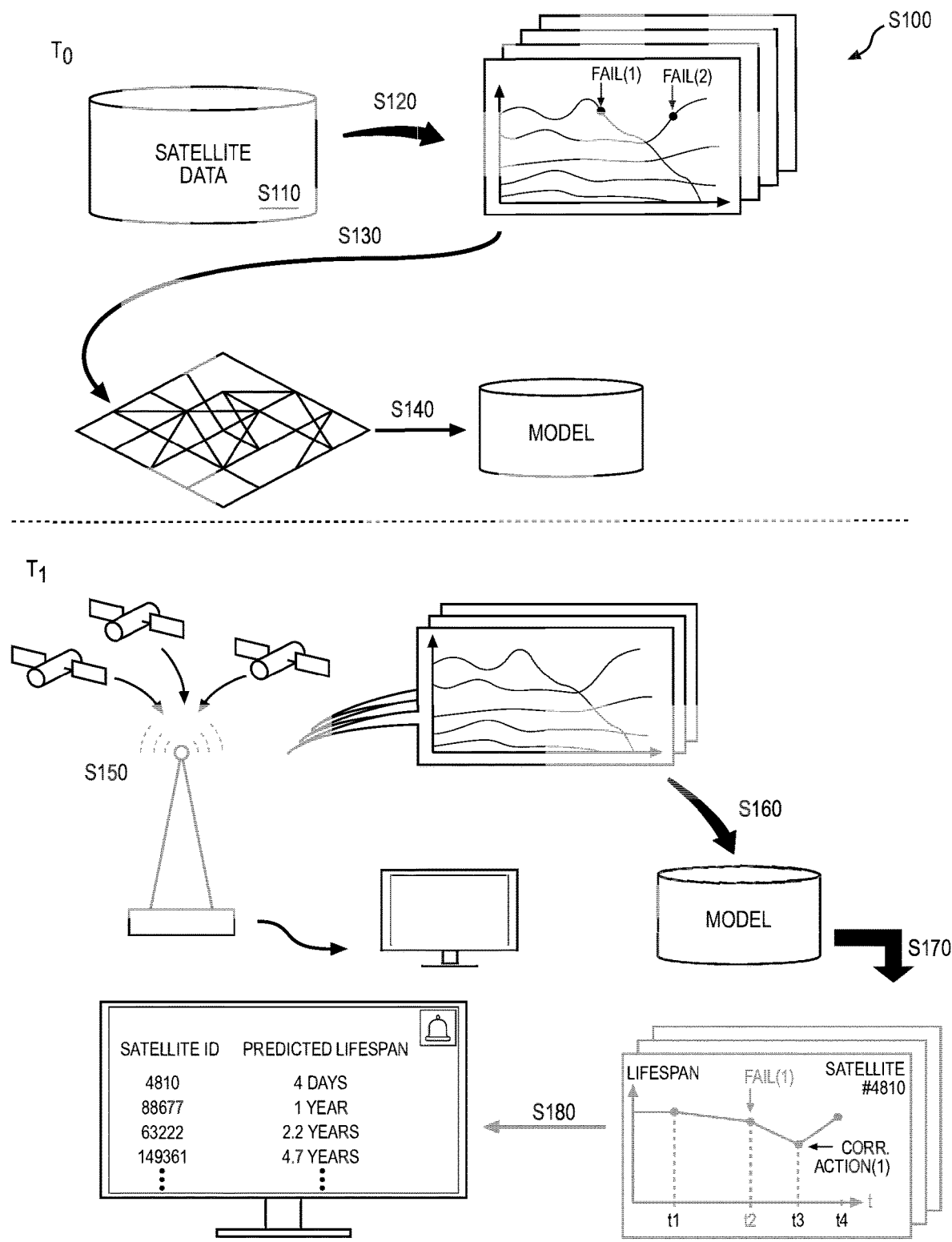
FIG. 1 is a flowchart representation of a first method.
Figure 2:
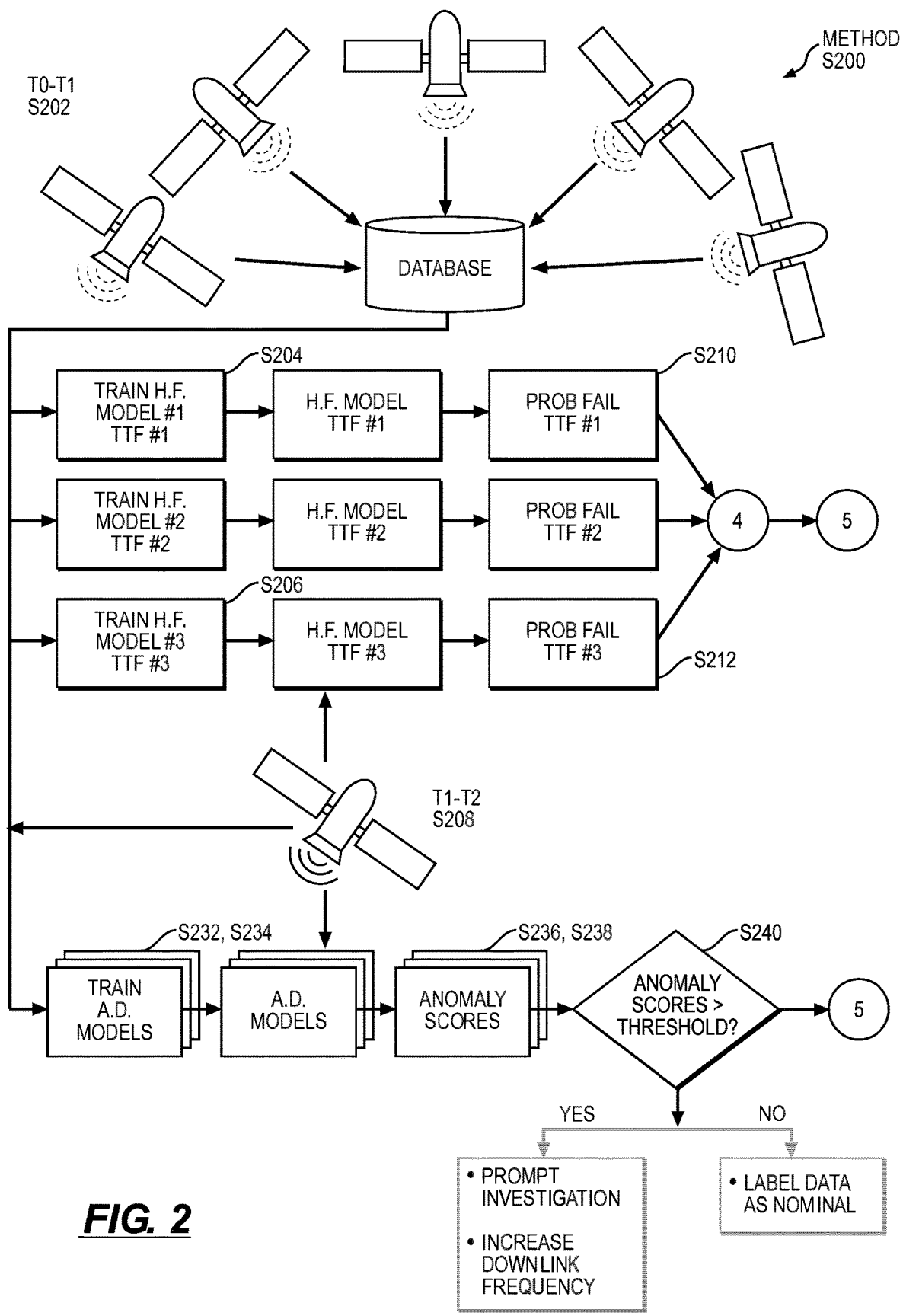
FIG. 2 is a flowchart representation of a second method.

As shown in FIG. 1, a method S100 for predictive maintenance of satellites includes, for each satellite in a first set of satellites in a population of satellites: accessing a historical dataset for the satellite including timeseries sensor data, timeseries failure data, and timeseries corrective action data in Block S110; segmenting the historical dataset for the satellite into a set of failure event segments, each failure event segment including a time period of an onset of a failure event based on the timeseries failure data and a conclusion of the failure event based on the timeseries corrective action data; for each failure event segment in the set of failure event segments for the satellite, extracting a set of failure event features representing properties of the failure event segment in Block S120; and generating a training feature vector, in a set of training feature vectors, for the failure event segment based on the set of failure event features in Block S130. The first method S100 also includes training a lifespan prediction model based on the set of training feature vectors for the first set of satellites in Block S140.

The first method S100 further includes, for each active satellite in a second set of satellites in the population of satellites: accessing an active dataset for the active satellite including timeseries sensor data, timeseries failure data, and timeseries corrective action data in Block S150; extracting a set of active satellite features representing properties of the active satellite; passing the set of the active satellite features into the lifespan prediction model in Block S160; and generating a lifespan prediction of the active satellite based on the lifespan prediction model in Block S170.

The first method S100 also includes: ranking the second set of satellites in order of a length of a lifespan prediction of a corresponding satellite; transmitting a ranked list of the second set of satellites based on the ranking to an operator portal in Block S180; and prompting prioritization, via the operator portal, of evaluation of the second set of satellites according to the ranked list.

1.1 Applications

Generally, the first method S100 can be executed by a computer system (hereinafter "the system") to: generate lifespan predictions of a fleet of active satellites orbiting in space; predict upcoming failure events for select satellites based on these lifespan predictions; and prompt preferential review of these satellites by an operator responsive to these predicted failure events in order to prevent and/or mitigate failures across this fleet of active satellites. More specifically, by executing the first method S100, the system can detect a change in a predicted lifespan of an active satellite, such as a decrease in predicted lifespan that presages an ongoing or upcoming failure.

For example, a satellite may include a suite of actuators and controls and may exhibit many (e.g., hundreds, thousands) possible failure modes, at least some of which may be corrected through remote monitoring by an operator and remote control of the suite of actuators and controls. The satellite may also include a suite of physical and software-based sensors, and each possible failure mode may be represented in multiple or many sensor streams output by this suite of sensors. Therefore, rather than disambiguate a particular failure mode from one or a set of sensor data streams, which may be noisy and prone to error (e.g., a high false positive and false negative rate), the system can execute Blocks of the second method S200 to fuse many (or all) of these sensor data streams into a prediction for the remaining lifespan of the satellite. When the remaining lifespan of this satellite diminishes faster than nominal time (e.g., an average lifespan set forth by a manufacturer of the satellite), the system can predict an ongoing or upcoming failure at the satellite and prompt investigation by an operator, who may then perform corrective action to avoid, mitigate, or correct the failure. Therefore, by monitoring the predicted lifespan of the active satellite, the system can predict a failure event—without identification of the particular type or modality of this failure event—that reduces the predicted lifespan of the satellite (e.g., by as little as hours) and prompt an operator to investigate the satellite, thereby enabling the operator to avoid a catastrophic failure of the satellite (e.g., complete shutdown, a fire, explosion, a total communication loss) and extend the useful lifespan of the satellite.

In one implementation, the system can train a lifespan prediction model based on a training set of satellites (e.g., inactive and/or decommissioned satellites, ground-tested satellites, active satellites, or some combination thereof) to output a prediction of a lifespan of an active satellite. For example, the system can implement an adversarial or convolutional neural network to train the lifespan prediction model using a training set of satellites, thereby enabling the system to construct the lifespan prediction model with several different types of data (complete or incomplete) from several different sources in a computationally lightweight manner.

The system can also include or host an operator portal that enables an operator to: review historical data—including timeseries sensor data, timeseries failure data, timeseries corrective action data—of a set of satellites (e.g., inactive and/or decommissioned satellites, ground-tested and/or prototype-only satellites, active satellites, or some combination thereof) in a population of satellites; label and/or annotate the timeseries sensor data accordingly for machine learning training; visualize and monitor a predicted lifespan and the performance of a set of components for an active satellite; and investigate potential failure events and troubleshoot corresponding corrective actions to prevent and/or manage the failure events. Accordingly, the system can interface with the operator via the operator portal to prompt and facilitate investigation and diagnosis of potential failure events at active satellites.

1.2 Operator Portal

In one implementation, the operator portal (e.g., executed by a computing device such as a desktop or mobile computer) can: render a graphical user interface; populate the graphical user interface with a set of satellite identifiers and corresponding data for each satellite in the set of satellites; display a graphical representation of a historical timeline of a lifespan of each satellite; and identify events (e.g., failure events, corrective action events such as maintenance and/or repairs) in the historical timeline occurring over the lifespan of the satellite.

In one example, the operator portal can, in an evaluation mode: render the graphical user interface; populate the graphical user interface with historical data (including, for example, timeseries sensor data, timeseries failure data, and timeseries corrective action data) of a satellite in a set of satellites; and receive annotations, by an operator, of the historical data, such that the system can correlate the historical data with a lifespan of the satellite and predict when particular changes in sensor data indicate a potential failure event that can negatively impact the lifespan of the satellite. More specifically, the system can leverage the operator annotations of the historical data to predict a lifespan of other satellites in order to prevent and/or manage future failure events.

In another example, as shown in Block S180, the operator portal can, in an operational mode: render the graphical user interface; populate the graphical user interface with satellite identifiers of a set of active satellites orbiting in space and corresponding sensor data captured and transmitted by the set of active satellites; flag detected changes in the sensor data of the satellite in real-time; and generate warning prompts in response to the detected changes exceeding a threshold, thereby enabling an operator to quickly visualize a status of an active satellite, make informed decisions to prevent and/or manage failure events of the active satellite, and thus improve the lifespan of the active satellite.

Thus, the operator portal can facilitate the process of identifying failure events and learning warning signs of a failure event in historical data of a set of satellites that have experienced failure events (e.g., inactive and/or decommissioned satellites, ground-tested and/or prototype-only satellites) and support the monitoring and maintenance of a set of active satellites to prevent and/or manage failure events.

1.2.1 Evaluation Mode

In one implementation, an operator can use the operator portal in an evaluation mode to review historical data of satellites (e.g., timeseries sensor data, timeseries failure data, and/or timeseries corrective action data) and annotate the historical data with insights, reasoning, and explanations for various events (e.g., failure events) that occur over a lifespan of a satellite. In one example, the operator portal can display a historical timeline of a lifespan of a satellite in a first graphical representation, which can include: a set of failure events (system-wide or for a set of components of the satellite); a date and/or range of dates associated with each event; information about a particular set of components of the satellite involved in the event (e.g., corresponding sensor data leading up to and at a time of each event); annotations associated with each event such as a labeling of the type of event (e.g., malfunction, failure, repair); and/or a set of corrective actions to the satellite in response to each event (i.e., what was attempted to repair the satellite, what worked, and why it worked). In one example, the operator portal can display the actual lifespan of the satellite (e.g., an amount of time that the satellite is active before decommission and/or a failure event that leads to decommission) in a portion of the user interface next to the graphical representation of the historical timeline.

In one implementation, the operator portal can enable an operator to retroactively annotate the historical data. For example, an operator can: slide and/or toggle through different failure events on the historical timeline of the lifespan of the satellite; and label and/or annotate each failure event with factors such as a type of failure event, a criticality of the failure event, a type and/or complexity of repair or corrective action; a reasoning and/or cause for each event; and/or a set of recommendations for future corrective actions.

Accordingly, the operator portal can enable an operator to learn and gain insight from historical data of a satellite. For example, while reviewing historical data of a satellite via the operator portal, an operator can: identify specific events in the historical data (e.g., a specific failure event occurs at the same time each day), cause-and-effect scenarios (e.g., a solar panel state is closed, thus causing battery power to decrease), and/or opportunities for intervention (i.e., a corrective action that could have taken place at a particular time to prevent a failure event).

In one implementation, the operator can simulate a predicted effect of a corrective action on the satellite based on the historical data and observe a change in a predicted lifespan of the satellite. More specifically, the operator portal can: display a magnitude of an actual lifespan of the satellite; generate a first graphical representation illustrating the actual lifespan of the satellite; highlight a failure event in the first graphical representation that occurred at a particular time in the actual lifespan of the satellite; highlight a set of corrective actions in the first graphical representation that were taken in response to the failure event; generate a second graphical representation of a simulation of a corrective action to the satellite that could have improved the actual lifespan of the satellite; display a magnitude of a predicted lifespan of the satellite based on the simulation of the corrective action to the satellite.

Further, the operator portal can display a set of selections for different/alternate corrective actions (e.g., a set of toggles, sliders, buttons) that an operator can selectively modify to visualize the response of the selected corrective action on the predicted lifespan of the satellite. Accordingly, an operator can: visualize a predicted effect of different corrective actions on the lifespan of the satellite; select a corrective action based on the corresponding predicted effect; and improve recommendations for future failure events for other satellites.

1.3 Data Acquisition

Generally, in Block S110, the system can: access a database in Block S110 for a population of satellites including inactive or decommissioned satellites (e.g., a satellite that undergoes ground-based testing; is deployed to orbit about the Earth and capture and transmit corresponding data of the satellite; and then experiences a failure event leading to the decommissioning of the satellite), active satellites (e.g., a satellite that undergoes ground-based testing; is deployed to actively orbit about the Earth; and continuously (or intermittently) captures and transmits corresponding data of the satellite as it actively orbits about the Earth), and/or prototype-only and/or ground-tested-only satellites (e.g., a satellite that undergoes ground-based testing without being deployed to orbit about the Earth). For each satellite in the population of satellites, the system can: access a dataset for the satellite including timeseries sensor data (corresponding to a set of components of the satellite), timeseries failure data (for identified and predicted failure events of a satellite), and/or timeseries corrective action data (a set of corrective actions such as maintenance and/or repairs taken in response to a failure event); temporally align the different sources of data in Block S120; and analyze the aligned data to identify sensor data leading up to and at a time of a failure event, a set of failure events of the satellite, and a set of corrective actions taken in response to the set of failure events in Block S130.

1.4 Data Structures: Sensor Data

In one implementation, the system can analyze data captured by a set of sensors corresponding to a set of components of a satellite at a series of timepoints in a given time period (e.g., captured continuously or intermittently at specified or random intervals). In particular, the system can access (e.g., from the database in Block S110) timeseries sensor data for a satellite including a voltage or state of charge of a battery powering the satellite, an attitude of the satellite (e.g., orientation of the satellite within the Sun or Earth coordinate system), an altitude of the satellite, temperature statuses of different parts of the satellite (e.g., battery, solar panels, communication module and/or transponder, flight control module), a level of communication module connectivity of the satellite to a mission control (e.g., on Earth), an internal system pressure level, a state of a set of solar panels on the satellite (e.g., open or closed), and other relevant parameters of the satellite.

In one example, the system can access historical timeseries sensor data of the satellite and/or timeseries sensor data for the satellite captured in real-time during ground testing and/or operation of the satellite.

Accordingly, the system can identify changes (e.g., increases and/or decreases) in a performance and/or operational status of the set of components of the satellite over the given time period; and detect a state of the satellite at a particular point in time of the given time period in Block S120.

1.4.1 Data Structures: Failure Data

In one implementation, the system can analyze timeseries failure data of failure events of a satellite over a given time period. In particular, the system can access (e.g., from the database in Block S110) a failure log of failures identified and managed during ground testing and/or operation of the satellite. For example, in the failure log, the system can identify a failure event of the satellite including a failure type, a failure date, a failure duration, a failure severity (e.g., a catastrophic failure, subsystem failure, or reduced capability), and annotations (e.g., by an operator) describing additional details, insight, and/or a reasoning for the failure event in Block S120.

For example, a first failure event can designate: a failure type of a total loss of system power, a failure date of Mar. 22, 2021 at 8:02 am, a failure duration of 42 minutes, a failure severity of catastrophic failure, and an annotation indicating that the total loss of system power was instigated by a faulty power cable. In another example, a second failure event can designate: a failure type of incongruent data between redundant temperature sensors on the solar panels, a failure date of Aug. 8, 2018 at 4:31 pm, a failure duration of 3 minutes, a failure severity of reduced capability of the solar panels (e.g., solar panels limited to 80% open rather than 100% open), and annotations indicating that a first temperature sensor captured temperature data of the solar panel within a normal range and a second temperature sensor exceeding the normal range due to a particular orientation of the solar panel toward the sun. In another example, a third failure event can designate: a failure type of a loss of communication link to ground control, a failure date of Apr. 3, 2019 at 11:09 am, a failure duration of 2 months, a failure severity of a catastrophic failure, and annotations indicating that the loss of communication link was due to a small meteor hitting the transponder of the satellite.

Additionally or alternatively, the system can access a set of annotations in lieu of the failure log (e.g., timeseries sensor data reviewed post hoc by an operator and labeled with identified failure event(s)). For example, the set of annotations can include a labeled onset of the failure event, a date, time, and duration of the failure event, a set of components involved in the failure event, and/or an identified timepoint at which the criticality of the failure event was significant to affect overall operation/functionality of the satellite.

In another implementation, the system can analyze timeseries failure data for predicted failure events of a satellite over a given time period. In particular, the system can access (e.g., from the database) a predicted failure log of failures predicted and prevented and/or managed during ground testing and/or operation of the satellite. For example, in the predicted failure log, the system can identify a predicted failure event of the satellite including a predicted failure type, a predicted failure date and time, a predicted failure duration, and/or a predicted failure severity (e.g., a catastrophic failure, subsystem failure, or reduced capability).

In one implementation, an operator can: view historical data on the software operator portal in the evaluation mode; predict a failure event based on the historical data; and create the predicted failure log by logging a predicted time, type, and/or corrective action needed for the predicted failure.

Accordingly, the system can identify failure events—both detected and predicted—in a lifespan of a satellite.

1.4.2 Data Structures: Corrective Action Data

In one implementation, the system can analyze timeseries corrective action data of a satellite over a given time period in Block S120. In particular, the system can access (e.g., from the database in Block S110) a corrective action log of actions taken in response to a failure event of a satellite. For example, in the corrective action log, the system can identify a type of corrective action taken (e.g., maintenance, repair, shutdown, reduced capability), a time at which the corrective action was taken, a duration of time for the satellite to return to active operation after the corrective action was taken, and/or a complexity of the corrective action.

For example, a first corrective action can designate: a corrective action type including a repair of a communication link module, a date and time of Mar. 23, 2021 at 11:38 am at which the corrective action was taken, a duration of 48 minutes for the satellite to return to active operation, and a complexity level of 40%.

In another implementation, the system can identify a type of corrective action taken in response to a predicted failure event of a satellite to prevent the failure event from occurring.

1.5 Data Alignment and Labeling

In one implementation, the system can: temporally align the timeseries sensor data, timeseries failure data, and/or timeseries corrective action data by time; label the timeseries sensor data with the failure events based on the timeseries failure data and with the corrective actions based on the timeseries corrective action data; and correlate the timeseries sensor data with a corresponding failure event and corrective action (or set of corrective actions) taken in response to the failure event in Block S120. In particular, the system can associate changes (e.g., increases and/or decreases) at a first timepoint in the performance and/or operational status of a set of components of the satellite to a specific failure event and changes (e.g., increases and/or decreases to return to normal) at a subsequent, second timepoint in the performance and/or operational status of the set of sensors to a specific corrective action performed in response to the failure event.

For example, the system can: identify a decrease in battery performance on Apr. 3, 2018 at 3:18 pm based on the timeseries sensor data; identify a failure event of reduced capability of the stabilization thrusters on Apr. 3, 2018 at 3:22 pm based on the timeseries failure data; identify a corrective action of opening the solar panels from 50% to 100% on Apr. 3, 2018 at 3:25 pm based on the timeseries corrective action data; and identify an increase in battery performance on Apr. 3, 2018 at 3:26 pm based on the timeseries sensor data. Subsequently, the system can identify a restoration of capability of the stabilization thrusters on Apr. 3, 2018 at 3:28 pm.

In another implementation, the system can: transform failure logs and corrective action logs into timeseries failure data and timeseries corrective action data; and temporally align these timeseries failure data and timeseries corrective action data with the timeseries sensor data.

Accordingly, the system can generate a historical timeline of the state of the satellite by aligning several different sources of timeseries data; correlate a relationship between sensor data, failure data, and corrective action data; identify events that impact a lifespan of the satellite; and identify corrective actions accordingly that can be executed to improve a lifespan of the satellite.

1.6 Data Segmentation

In one implementation, the system can segment historical datasets of inactive satellites (e.g., decommissioned satellites, ground-tested and/or prototype-only satellites) based on an onset and a conclusion of a failure event for each satellite. The system can then train a lifespan prediction model based on the segmented data. Additionally or alternatively, the system can segment historical datasets of active satellites (i.e., currently deployed and orbiting in space) for training the lifespan prediction model.

In particular, the system can: segment the dataset (including timeseries sensor data, timeseries failure data, and timeseries corrective action data) for the satellite into a set of failure event segments, each failure event segment including a time period of an onset of a failure event based on the timeseries failure data and a conclusion of the failure event based on the timeseries corrective action data.

Additionally or alternatively, the system can segment the dataset for the satellite into the set of failure event segments by: temporally correlating timeseries sensor data with a set of failure events—detected and/or predicted failures—based on the timeseries failure data; temporally correlating timeseries sensor data with a set of corrective actions based on the timeseries corrective action data; identifying the onset and the conclusion of the failure event; and generating the failure event segment based on the onset and the conclusion of the failure event. In one example, the system can generate the failure event segment including a window of time before the onset of the failure event (e.g., a few days to a few weeks or months) to analyze sensor data of the satellite leading up to the failure event and capture warning signs of the failure event.

For example, for a first satellite in the population of satellites, the system can identify a set of failure events in the historical timeline of the lifespan of the satellite—e.g., the satellite is deployed at an initial timepoint T0, a first failure event occurs at T1, a first corrective action in response to the first failure event occurs at T1.5, a second failure event occurs at T2, a second corrective action in response to the second failure event occurs at T2.5, a third failure event occurs at T3, and a third corrective action in response to the third failure event occurs at T3.5. The system can then segment the historical dataset of the satellite into: a first segment from T0 to T1.5, labeled for the first failure event and corresponding corrective action; a second segment from T1.5 to T2.5, labeled for the second failure event and corresponding corrective action; and a third segment from T2.5 to T3.5, labeled for the third failure event and corresponding corrective action. Accordingly, the system can repeat the data segmentation for other inactive/decommissioned, active, and ground-tested/protype-only satellites in the population of satellites.

Therefore, the computer system can: decompose timeseries sensor data for a satellite into multiple data segments, each labeled with a failure event and a corresponding corrective action.

1.7 Lifespan Prediction Model

In one implementation, in Block S140, the system can construct a lifespan prediction model based on historical data—timeseries sensor data, timeseries failure data, timeseries corrective action data—of a training set of satellites (including inactive and/or active satellites) in the population of satellites, the model predicting a lifespan of an active satellite based on timeseries sensor data of the active satellite. In one example, the system can execute the lifespan prediction model to predict the lifespan of an active satellite in real-time and identify changes in the predicted lifespan over a period of time as an indicator of a potential/impending failure event or of a current failure event (i.e., the inverse of a predicted lifespan is a predicted time to failure).

In one example, the system can: receive timeseries sensor data of an active satellite (e.g., in real-time); execute the lifespan prediction model continuously and/or at different time intervals (e.g., once per day, once per minute, once per second) over a given time period; generate a predicted lifespan value for the active satellite at different timepoints of the given time period using the lifespan prediction model; track each predicted lifespan value over the given time period; detect a decrease in predicted lifespan value of the active satellite between a first timepoint and a second timepoint succeeding the first timepoint; generate a warning prompt in response to a magnitude of the decrease exceeding a threshold; and transmit the warning prompt to the operator portal for evaluation by an operator.

Accordingly, the system can monitor the state of an active satellite based on timeseries sensor data captured and transmitted by the satellite in real-time to the operator portal in Block S150; predict the lifespan of the active satellite in Block S160; detect changes in the lifespan prediction indicative of a potential failure event in Block S170; and prompt an operator via the operator portal to investigate the changes and, thus, implement corrective action to prevent and/or manage the failure event in Block S180.

1.8 Lifespan Model Training

In one implementation, in Block S140, the system can train the lifespan prediction model to output a prediction of a lifespan of a satellite based on the segmented data of a training set of satellites (e.g., inactive and/or decommissioned satellites, ground-tested satellites, active satellites, or some combination thereof) in the population of satellites. More specifically, the system can train the lifespan prediction model based on the segmented data of inactive and/or decommissioned satellites and/or ground-tested satellites to then execute the model to predict a lifespan for active satellites.

In particular, the system can: for each failure event segment in the set of failure event segments for the satellite, extract a set of failure event features representing properties of the failure event segment; generate a training feature vector, in a set of training feature vectors, for the failure event segment based on the set of failure event features; and train the lifespan prediction model based on the set of training feature vectors for the training set of satellites in the population of satellites.

For example, the system can implement an adversarial or convolutional neural network in Block S130 to train the lifespan prediction model that can then predict a lifespan of an active satellite based on timeseries sensor data received from the satellite in Block S140. Therefore, the lifespan prediction model can predict a lifespan of a satellite—inversely, an amount of time to a critical failure event of the satellite—based on live sensor data captured by the satellite and received in real-time.

1.9 Lifespan Model Operation

In one implementation, in Block S150, the system can monitor a set of active satellites based on a corresponding lifespan prediction for each active satellite in the set of active satellites. In particular, the system can: receive live sensor data captured at a first timepoint from a first active satellite, in a set of active satellites in Block S150; input the live sensor data of the first active satellite into the lifespan prediction model in Block S160; calculate a first lifespan prediction value for the first active satellite in Block S170; and perform these steps for each active satellite in the set of active satellites. The system can then: generate a ranked list of the active satellites with the satellite characterized by a shortest predicted lifespan identified first in the ranked list in Block S180. For example, Satellite #784 has a predicted lifespan of 2 months and is ranked first in the ranked list of the active satellites, while Satellite #3560 has a predicted lifespan of 14 months and is ranked second in the ranked list.

In order to monitor the changes of the states of the set of active satellites in real-time, the system can execute the lifespan prediction model at different time intervals (e.g., once per day, once per minute, once per second) to update the ranked list of the active satellites. In particular, the system can: receive live sensor data captured at a second timepoint succeeding the first timepoint from the first active satellite, in the set of active satellites; input the live sensor data of the first active satellite into the lifespan prediction model; calculate a second lifespan prediction value for the first active satellite; and perform these steps for each active satellite in the set of active satellites. The system can then: update the ranked list of the active satellites with the satellite characterized by the shortest predicted lifespan identified first in the ranked list. Accordingly, the system can identify changes in the lifespan prediction values for each active satellite in the set of active satellites over a given period of time and continuously and/or intermittently update the ranked list of active satellites.

In another implementation, the system can monitor an amount of change in predicted lifespan of an active satellite over a given period of time. In particular, the system can: generate the ranked list of the active satellites with the satellite characterized by a greatest amount of change in predicted lifespan over the first timepoint and the second timepoint identified first in the ranked list. For example, Satellite #9923 has a predicted lifespan of 10 years at the first timepoint T1 and a predicted lifespan of 6 years at the second timepoint T2, while Satellite #8471 has a predicted lifespan of 2.3 years at T1 and a predicted lifespan of 2.2 years at T2. Accordingly, the system can rank Satellite #9923 (with an amount of change in predicted lifespan of 4 years) first in the ranked list and Satellite #8471 (with an amount of change in predicted lifespan of 0.1 years) second. The system can execute the lifespan prediction model for the set of active satellites at different time intervals over a given time period to continuously and/or intermittently update the ranked list of the active satellites.

In yet another implementation, the system can monitor a lifespan offset (i.e., a predicted lifespan scaled by an expected lifespan) of an active satellite over a given time period. In particular, the system can: receive live sensor data captured at a first timepoint from the first active satellite, in the set of active satellites; input the live sensor data of the first active satellite into the lifespan prediction model; calculate the lifespan prediction value for the first active satellite; subtract an age (e.g., an amount of time from manufacturing) of the first active satellite from a target lifespan of the first active satellite (e.g., an average lifespan of a satellite is approximately 15 years) in order to calculate a nominal lifespan value; calculate a lifespan offset based on a difference between the nominal lifespan value and the lifespan prediction value for the first active satellite; and perform these steps for each active satellite in the set of active satellites. The system can then: generate a ranked list of the active satellites with the satellite characterized by a greatest lifespan offset value ranked first. For example, Satellite #663 has a lifespan offset value of 2 months and is ranked first in the ranked list of the active satellites, while Satellite #8234 has a predicted lifespan of 14 months and is ranked second in the ranked list. The system can execute the lifespan prediction model for the set of active satellites at different time intervals over a given time period to continuously update the ranked list of the active satellites.

In yet another implementation, the system can monitor changes in predicted lifespan of a set of active satellites based on a priority (e.g., importance, value, mission-critical) of each satellite in the set of active satellites. In particular, the system can: repeat the foregoing processes described herein to generate a ranking for each active satellite in the set of active satellites; weigh (e.g., multiply) the initial ranking based on the corresponding priority of the satellite; and then generate a weighted ranked list of the set of active satellites. For example, Satellite #754 has a predicted lifespan of 1.2 years and a weighted priority of 0.12 (e.g., Satellite #754 is facilitating a low priority task, such as capturing and transmitting weather data), while Satellite #902 has a predicted lifespan of 3 years and a weighted priority of 0.9 (e.g., Satellite #902 is facilitating a high priority task, such as a government military mission). Although Satellite #754 has a shorter predicted lifespan than Satellite #902, Satellite #902 is ranked first in the weighted ranked list due to its higher priority.

Therefore, the system can predict a lifespan for each active satellite in a set of active satellites based on live sensor data captured by the active satellites and generate a ranked list for the set of active satellites such that an operator can prioritize evaluation of the set of active satellites, via the operator portal, based on changes in performance to each active satellite occurring in real-time.

1.10 Thresholds

In one implementation, the system can set a threshold for an amount of observed change in a predicted lifespan of an active satellite, wherein exceeding the threshold indicates a potential failure event of the active satellite, thus requiring investigation by an operator to prevent and/or manage the potential failure event and improve the lifespan of the active satellite.

In particular, the system can: calculate a threshold value for a predicted lifespan of an active satellite, the threshold value representing an amount of decrease in the predicted lifespan over a period of time (e.g., predicted lifespan drops from 98% at T1 to 91% at T2); generate a warning prompt in response to the change in predicted lifespan exceeding the threshold value; and transmit the warning prompt, via the operator portal, to an operator for evaluation.

In one example, the system can generate a warning prompt in response to the decrease in predicted lifespan for a specified amount of time (e.g., drops to 91% for a minimum of 2 minutes). In another example, the system can generate a warning prompt in response to a rate of the decrease in lifespan exceeding a rate threshold value. More specifically, the system can detect a rapid decline in the predicted lifespan of a satellite, which can indicate a severity and/or complexity of the potential failure event and prompt an accelerated investigation of the active satellite.

In another implementation, the system can set a threshold value for an amount of observed change for performance of a set of components of the satellite. For example, based on the timeseries sensor data, the system can detect a decrease in solar panel performance (e.g., a drop from 96% at T1 to 70% at T2) exceeding a threshold value and generate a warning prompt to investigate the solar panels of the active satellite.

Thus, the system can identify changes in a state of the satellite—system-wide in terms of predicted lifespan and/or component-based in terms of performance—and generate a corresponding warning prompt for investigation by an operator to prevent and/or manage a potential failure event of the satellite.

1.11 Populating the User Interface

In one implementation, in Block S180, the system can populate the graphical user interface of the operator portal—in an operational mode—with information for a set of active satellites, such that an operator can navigate through the set of active satellites, monitor changes in a predicted lifespan of each active satellite, and select a specific satellite in the set of active satellites to monitor a performance of a set of components of the satellite and/or observe and investigate a potential failure event for the satellite. In particular, the system can display satellite identifiers for the set of active satellites in order of ranking based on the ranked list for the active satellites in Block S180; and, in response to an operator selection of a specific satellite identifier in the set of satellites, display a satellite profile page including a set of graphical representations to visualize a performance and/or state of the active satellite and a predicted lifespan of the active satellite.

For example, the system can populate a dashboard of the operator portal including a ranked list of the set of active satellites on a left portion of the dashboard (e.g., ranked in order of predicted lifespan, a change in predicted lifespan, a lifespan offset, or some combination thereof), a corresponding predicted lifespan displayed next to each satellite, and an alert window in an upper right portion of the dashboard including a running list of warning prompts generated for a subset of active satellites. The system can continuously and/or intermittently update the ranked list based on new lifespan prediction values calculated for each satellite in the set of active satellites. In response to a selection by an operator of a specific satellite from the ranked list, the system can display a satellite profile page for the selected satellite including a first graphical representation depicting a predicted lifespan of the specific satellite over a given period of time—calculated via the lifespan prediction model at different timepoints in the given period of time—and a second graphical representation depicting timeseries sensor data for a set of components of the specific satellite—captured in real-time (e.g., a parallel coordinate plot that can depict sensor data for the set of components at multiple timepoints, enabling an operator to visualize a change in the performance of the set of components over time). Accordingly, an operator can monitor changes to the predicted lifespan of the satellite and the state of the components of the satellite.

In response to a threshold value, described herein, being exceeded for an active satellite in the set of active satellites, the system can: generate a warning prompt for the active satellite; and transmit the warning prompt via the operator portal. In one example, the system can highlight and/or emphasize (e.g., flashing in alternating colors) an active satellite in the ranked list of active satellites on the operator portal dashboard based on a presence of a warning prompt corresponding to the active satellite. Additionally or alternatively, the system can generate a pop-up window containing the warning prompt for an active satellite and/or add the warning prompt for the active satellite to the alert window in the upper right portion of the dashboard. For example, an operator can click on and/or select the window containing the warning prompt, navigate to the satellite profile page for the satellite with the corresponding warning prompt, and review the set of graphical representations—of the predicted lifespan and the timeseries sensor data—for the satellite. Accordingly, the system can: alert an operator of changes in sensor data indicative a potential failure event of an active satellite; and prompt the operator to investigate the state of the satellite based on the timeseries sensor data.

In one implementation, the system can display a recommendation for a corrective action for an active satellite to an operator (e.g., to investigate a particular set of components) in the form of a text box and/or highlight a particular set of components in the second graphical representation for further investigation. In one example, the system can generate a third graphical representation of an effect of the recommendation on the predicted lifespan of the satellite. In particular, the system can simulate changes to the satellite and display a simulated response in the predicted lifespan of the satellite and/or performance of the set of components of the satellite, thus facilitating investigation and troubleshooting, by the operator, of potential corrective actions to manage and/or prevent a failure event of the satellite. Additionally, the system can offer a set of alternate recommendations for review, evaluation, and/or simulation in response to a selection of a recommendation by the operator.

In one implementation, the system can enable an operator to implement a recommendation for a corrective action to a satellite. In particular, the operator portal can transmit a command to a communication system of the satellite executing the corrective action. The system can then display, in real-time, the sensor data of the satellite, enabling an operator to observe an actual response (e.g., improvement) in the state of the satellite components and/or the predicted lifespan of the satellite.

1.12 Failure Mode Model

In another implementation, the system can construct a failure event prediction model based on historical data—timeseries sensor data, timeseries failure data, timeseries corrective action data—of a training set of satellites (including inactive and/or active satellites) in the population of satellites, the model predicting an amount of time to a failure event of an active satellite based on timeseries sensor data of the active satellite. In one example, the system can execute the failure event prediction model to predict the amount of time to the failure event of an active satellite in real-time.

In one example, the system can: receive timeseries sensor data of an active satellite (e.g., in real-time); execute the failure event prediction model continuously and/or at different time intervals (e.g., once per day, once per minute, once per second) over a given time period; generate a predicted time to failure event value for the active satellite at different timepoints of the given time period using the failure event prediction model; track each predicted time to failure event value over the given time period; detect an increase in predicted time to failure event value of the active satellite between a first timepoint and a second timepoint succeeding the first timepoint; generate a warning prompt in response to a magnitude of the increase exceeding a threshold; and transmit the warning prompt to the operator portal for evaluation by an operator.

Accordingly, the system can monitor the state of an active satellite based on timeseries sensor data captured and transmitted by the satellite in real-time to the operator portal; predict the time to failure event of the active satellite; detect changes in the predicted time to failure event values; and prompt an operator via the operator portal to investigate the changes and, thus, implement corrective action to prevent and/or manage the potential failure event.

2. Second Method

Figure 3:
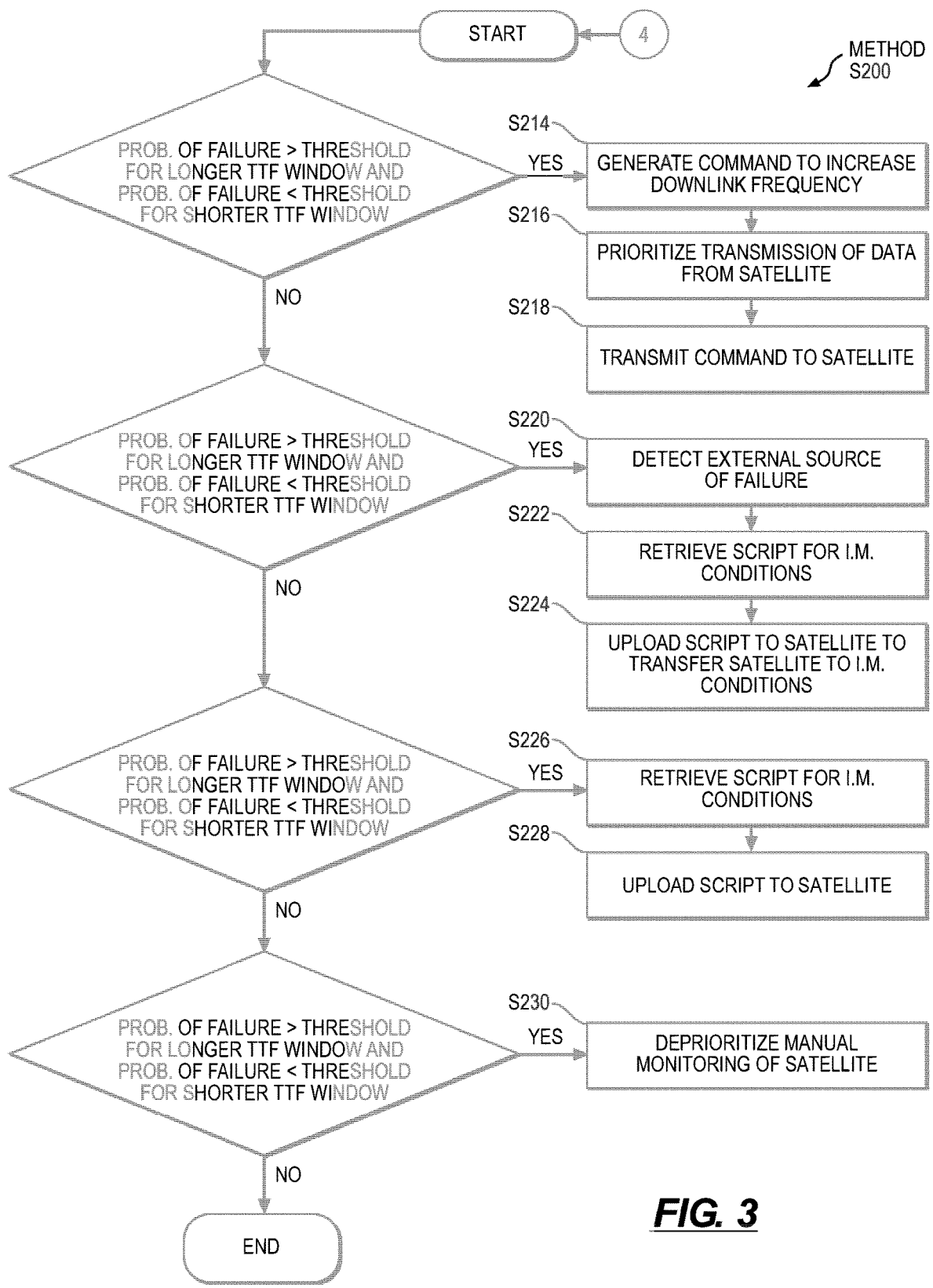
FIG. 3 is a flowchart representation of one variation of the second method.

As shown in FIG. 3, a second method S200 includes, during a first time period: accessing first historical timeseries telemetry data and first timeseries failure data for a first population of satellites in Block S202; training a first model to predict failures within the first population of satellites within a first time window based on the first timeseries telemetry data and first timeseries failure data in Block S204; and training a second model to predict failures within the first population of satellites within a second time window, shorter than the first time window, based on the first timeseries telemetry data and the first timeseries failure data in Block S206. The second method S200 also includes, during a second time period: accessing a first set of timeseries telemetry data broadcast by a first satellite at the first downlink frequency during a current time interval in Block S208; predicting a first probability of failure of the first satellite within the first time window based on the first model and the first set of timeseries telemetry data in Block S210; and predicting a second probability of failure of the first satellite within the second time window based on the second model and the first set of timeseries telemetry data in Block S212. The second method S200 further includes, in response to the first probability of failure exceeding a first threshold probability and the second probability of failure falling below the first threshold probability: generating a first command to increase the first downlink frequency and prioritize transmission of telemetry data from the first satellite in Blocks S214 and S216; and transmitting the first command to the first satellite in Block S218.

One variation of the second method S200 includes, during a first time period: accessing first historical timeseries telemetry data and first timeseries failure data for a first population of satellites in Block S202; training a first model to predict a failure of a first satellite of the first population of satellites within a first time window based on the first historical timeseries telemetry data and first timeseries failure data in Block S204; and training a second model to predict the failure within a second time window, shorter than the first time window, based on the first historical timeseries telemetry data and first timeseries failure data in Block S206. The second method S200 also includes during a second time period for a first satellite: accessing a first set of timeseries telemetry data broadcast by a first satellite at a first frequency during a current time interval in Block S208; predicting a first probability of failure of the first satellite within the first time window based on the first model and the first set of timeseries telemetry data in Block S210; predicting a second probability of failure of the first satellite within the second time window based on the second model and the first set of timeseries telemetry data in Block S212; and, in response to the first probability of failure falling below a first threshold probability and the second probability of failure exceeding the first threshold probability, detecting an external source of failure of the first satellite in Block S220, retrieving a script for transferring the first satellite to an investigation mode in Block S222, and uploading the script to the first satellite in Block S224.

Another variation of the second method S200 includes, during a first time period: accessing first historical timeseries telemetry data and first timeseries failure data for a first population of satellites in Block S202; training a first model to predict a failure of a first satellite of the first population of satellites within a first time window based on the first timeseries telemetry data and first timeseries failure data in Block S204; and training a second model to predict the failure within a second time window, shorter than the first time window, based on the first timeseries telemetry data and first timeseries failure data in Block S206. The second method S200 also includes, during a second time period for a first satellite: accessing a first set of timeseries telemetry data broadcast by a first satellite at a first frequency during a current time interval in Block S208; predicting a first probability of failure of the first satellite within the first time window based on the first model and the first set of timeseries telemetry data in Block S210; predicting a second probability of failure of the first satellite within the second time window based on the second model and the first set of timeseries telemetry data in Block S212; and, in response to the first probability of failure exceeding a threshold probability and the second probability of failure exceeding the threshold probability, retrieving script for entering an investigation mode in Block S226, and uploading the script to the first satellite in Block S228.

2.1 Applications

Generally, the second method S200 can be executed by a computer system to: predict and automatically execute scripts to prevent investigation mode conditions at remotely-monitored satellites; alert operators of off-nominal telemetry data and potential investigation mode conditions at these satellites; and aid in expedited anomaly resolution and failure prevention at these satellites. More specifically, the computer system can: implement a first set of models to predict a probability of safe mode operations during a proceeding duration of time based on past satellite behavior; implement a second set of models to detect anomalies in current data and satellite behavior relative to previously accessed data; implement layer explainable AI (SHAP values) (e.g., a third set of models) to assign influence scores to features of the satellite contributing to investigation mode conditions; and generate commands to the satellite to prevent further investigation mode conditions.

For example, the computer system implements a hazard function and off-nominal models to process incoming telemetry streams from deployed satellites to: predict future failures and events that will induce investigation mode conditions at these satellites; detect anomalous conditions relative to historical data; and attribute failures to particular satellite systems.

Generally, when the computer system can predict events that necessitate investigation mode conditions, the satellite can disable auxiliary systems while maintaining core or critical systems to enable remote issue or failure detection and investigation of the system and system operations, such as by a remote, ground-based operator. For example, the computer system can alert operators that a satellite is to enter investigation mode conditions within a designated Time to Failure (time-to-failure) window (e.g., the next 6 hours, the next 12 hours, the next 24 hours, the next 36 hours, etc.) based on predicted events and behaviors.

Generally, a population of satellites can be deployed over time. The population of satellites can be clustered in a region in space or spread out relative to the earth. Each satellite in the population of satellites contains various sensors, and subsystems (e.g., power, battery, etc.) that monitor the performance of the satellite, and the surrounding environment. Therefore, each satellite generates data during its lifecycle describing various settings and changes in performance parameters and sends the data (e.g., remaining battery life, system temperature changes, identified damages, etc.) to ground stations via telemetry streams for analysis.

In one implementation, the computer system can: access historical data from each satellite of the population of satellites; train a set of models with the historical data to predict entry into safe mode operations of each satellite within a time-to-failure window; implement the models to predict entry into safe mode operations of the satellite; and perform an action responsive to the prediction. For example, for a first satellite, if the computer system identifies that a probability of failure within a longer (e.g., 36-hour) time-to-failure window is greater than a threshold probability, but a probability of failure within a shorter (e.g., 6-hour) time-to-failure window is less than a threshold probability, the computer system can send a command to the satellite to increase frequency of downlinks and prioritize telemetry data transmission from that satellite compared to the other satellites in the population; and can avoid a future failure of the satellite by predicting a probability of failure greater than a threshold within a particular time-to-failure window (e.g., next 36 hours) based on collected data. Thus, the computer system can prioritize failure mitigation when failure is predicted within a shorter time-to-failure window.

In one example, if the computer system identifies that: a first probability of failure of a satellite within the longer time-to-failure window is less than a threshold probability and the probability of failure within the shorter time-to-failure window is also less than a threshold probability, the computer system can deprioritize manual monitoring of the satellite. In this example, the computer system can prevent corrective actions on the satellite when the probability of failure is less than a threshold probability in the next 36 hours as well as the next 6 hours. Thus, the computer system can prevent the satellite from investigation mode conditions when no failure is predicted.

In another example, the computer system identifies that: the probability of failure of a satellite within the longer time-to-failure window is greater than a threshold probability; and that a probability of failure within the shorter time-to-failure window is also greater than a threshold probability. Accordingly, the computer system can detect an internal source of system failure (e.g., a failure in a power subsystem) and send a script to the satellite to transfer the satellite into investigation mode conditions until the failure can be identified and corrected. In this example, if the computer system predicts failure within the next 36 hours and 6 hours, the computer system can alert a ground operator that failure is anticipated and that processes for failure mitigation (e.g., investigation mode conditions) should be initiated.

In another example, the computer system can access data from the satellite to detect that an external source (e.g., meteor impact, collision with space matter, etc.) caused the satellite failure. In this example, if the computer system can identify a probability of failure less than a threshold probability of a satellite within the longer time-to-failure window, but a probability of failure within the shorter time-to-failure window is greater than a threshold probability, the computer system can detect unknown or unrecognized events and send script to the satellite to induce investigation mode conditions. Thus, the computer system can, in response to a sudden increase in a probability of failure during a shorter time-to-failure window, prioritize entry of the satellite to investigation mode conditions to mitigate further damage or failure to the satellite and prompt investigation of the failure when the computer system did not predict failure during a longer time-to-failure window. Therefore the computer system can identify when unrecognized events are not associated with expected satellite system degradation (e.g., power loss, etc.) but potential external sources of failure (e.g., contact with space debris, etc.).

Thus, the computer system can access large volumes of data to provide operators with detailed diagnostics of not only when the satellite is to perform under investigation mode conditions, but also which satellite features are responsible and contribute to the system failure. Generally, the computer system implements multiple time-to-failure windows for prediction and analysis as longer time-to-failure windows (e.g., 36 hour) provide data with a cost of incurred noise, therefore limiting accuracy of predictions. In contrast, the computer system implements shorter time-to-failure windows (e.g., 6 hour) to provide predictions of increased accuracy but limit the amount of response time that operators have in mitigating failures. Thus, the computer system can generate predictions and identify failure across a range of time-to-failure windows not only to provide indicators of failure to operators in advance of the failure, but also to narrow the window of time specifying when the failure is predicted.

Generally, the second method S200 is described herein as executed by a computer system including a private non-networked computing device within a ground station in communication with a population of satellites. However, the second method S200 can be executed by an internet-connected computer system or a computer network. Additionally, or alternatively, the second method S200 can be executed locally on a computing device.

2.1.1 Additional Applications

Additionally, or alternatively, the computer system can, for each satellite in a fleet of satellites (e.g., grounded or deployed) collect sensor and telemetry data and store the data for a time-to-failure window. For example, the computer system can calculate the time-to-failure window from the collected data which is timestamped data according to observed intervention mode (e.g., safe mode) entries. The computer system can then compute a Remaining Useful Life (RUL) parameter (e.g., a time window) for each satellite based on a time between a current time (e.g., an absolute clock time) and a proceeding transition to intervention mode operations due to an event of interest (e.g., a failure event).

The computer system can define a time-to-failure (TTF) parameter specifying a duration of time between a current time and a transition to intervention mode operations. For example, the computer system can train a model (e.g., a LightGBM model) to predict the probability that a particular data record (e.g., timeseries data) is far in time from transitioning to intervention mode operations (e.g., generate a binary indicator of "0"), or close to transitioning to intervention mode operations (e.g., generate a binary indicator of "1"). The computer system can train the model with automatic hyperparmeter optimization toolkits, (e.g. Optuna) and validate the model with validation techniques (e.g., K-Fold cross-validation).

The computer system can train the model to implement a hazard function of classical survival analysis to predict a probability that a satellite will transition to intervention mode operations within the next time-to-failure window (e.g., 24 hours, etc.). For example, the computer system can access incoming telemetry and sensor data and predict entry into intervention mode based on a hazard function value (e.g., 0.5). For example if the computer system predicts a hazard function value exceeding a fresh hold hazard function value the computer system can indicate precursor signals for a future transition to intervention mode. The computer system can implement the model to compute shap (e.g., SHAPLEY) values for the incoming time series data. The computer system can implement the shap values for each time stamp, in addition to the hazard function predictions, to provide directions to a custodian (e.g., operator) of a satellite to the source (e.g., a subsystem, a battery, a power unit, etc.) of the satellite which triggered intervention mode operations.

2.2 Historical Data Acquisition

Block S202 of the second method S200 recites accessing first historical timeseries telemetry data and first timeseries failure data for a first population of satellites. Generally, in Block S202, the computer system can ingest historical timeseries telemetry data and historical timeseries failure data generated by a set of satellites during operation of the satellites once deployed and during ground testing of the satellites prior to deployment.

In one implementation, the computer system can access historical timeseries telemetry data and historical timeseries failure data for a population of satellites. The historical timeseries telemetry data (e.g., a set of data points) can capture measurements and performance metrics (e.g., power consumption, battery life, temperature, etc.) of various subsystems of each satellite beginning at a specified point in time (e.g., time of deployment, time of manufacturing, etc.). The historical timeseries telemetry data can include timeseries failure data including labeled times stamps specifying instances when a satellite previously experienced an anomaly or a failure event of entered into investigation mode conditions. Therefore, the computer system can identify how much time or remaining useful life each satellite of the set of satellites had during its operation lifecycle prior to entering investigation mode conditions.

2.3 Time-To-Failure Model Training

Blocks S204 and S206 of the method S200 recite: training a first model to predict failures within the first population of satellites within a first time window based on the first timeseries telemetry data and first timeseries failure data; and training a second model to predict failures within the first population of satellites within a second time window, shorter than the first time window, based on the first timeseries telemetry data and first timeseries failure data. Generally, in Blocks S204 and S206, the computer system trains a set of models based on the historical timeseries data accessed during deployment of a satellite to predict the probability of failure of a satellite for various time-to-failure windows.

In one implementation, the computer system can train a set of models based on a binary hazard function to predict a probability between "0" and "1" of failure of the satellite (e.g., a probability closer to 1 indicative of a higher probability of failure). More specifically, the computer system implements a hazard function to predict whether the satellite will survive to a point in time based on its survival to an earlier time. The computer system can train separate models for each time-to-failure window based on the historical timeseries data. For example, the computer system can: access historical timeseries telemetry data and timeseries failure data for the population of satellites; train a first model to predict failures within the first population of satellites within a first time window based on the first timeseries telemetry data and first timeseries failure data; and train a second model to predict failures within the first population of satellites within a second time window, shorter than the first time window, based on the first timeseries telemetry data and first timeseries failure data. Therefore, the computer system can implement past failure events and performance conditions of the satellite to predict future performance and failure conditions.

In one variation, the computer system can further train the set of models based on the historical timeseries data generated during ground testing of the population of satellites prior to deployment. For example, the computer system can access second historical timeseries telemetry data and second timeseries failure data based on ground testing of the first population of satellites; train the first model to predict a failure of the first satellite of the first population of satellites within a first time window based on the second historical timeseries telemetry data and second timeseries failure data; and train the second model to predict the failure within a second time window, shorter than the first time window, based on the second timeseries telemetry data and second timeseries failure data. Therefore, the computer system can implement preliminary data from testing of the satellite prior to deployment to make predictions on future performance.

2.4 Thresholds

Generally, the second method S200 can be executed by a computer system to: define threshold probabilities for failure and anomaly score thresholds. In one implementation, the computer system sets a threshold for a predicted probability of failure of a satellite. In this implementation, the computer system can implement the hazard function models to predict a probability of failure exceeding a set of thresholds (e.g., 0.5, 0.6, etc.) for each time-to-failure window. For example, the computer system can: set a first probability threshold for a first probability of failure of the satellite within the first time window; and set a second threshold for a second probability of failure of the first satellite within the second time window. More specifically, the computer system can generate an alert to a ground operator at a ground station of potential of failure when a probability of failure during a longer time-to-failure window (e.g., 36 hours) exceeds a threshold probability of 0.6, and will also alert the ground operator when a probability of failure during a shorter time-to-failure window (e.g., 6 hours) exceeds a threshold probability of 0.5. Alternatively, or additionally, the computer system can set one threshold probability for all of the time-to-failure windows (e.g., 0.6 for 6-hour, 12-hour, 24-hour, and 36-hour time-to-failures) such that the computer system generates an alert anytime a probability of failure exceeds the threshold anomaly score. Therefore, the computer system can indicate a potential failure event of the satellite and prompt investigation by an operator to prevent and/or manage the potential failure event to improve the lifespan of the satellite.

In one implementation, the computer system can set a threshold for classifying timeseries telemetry data as anomalous. The computer system can implement the anomaly detection models to characterize current telemetry timeseries data as anomalous relative to historical timeseries telemetry data based on a threshold anomaly score for the set of time-to-failure windows or for each time-to-failure window. Additionally, or alternatively, the computer system can implement an isolation forest to classify telemetry time series data as nominal or anomalous based on an anomaly score. For example, the computer system can characterize telemetry timeseries data as nominal when the anomaly detection model generates an anomaly score falling below a threshold anomaly score (e.g., "0"). The computer system can characterize telemetry timeseries data as anomalous when the anomaly detection model generates an anomaly score exceeding the threshold anomaly score and when the anomaly score increases and deviates from "0" (e.g., "2", "5", "10", etc.). For example, if the computer system implements the anomaly detection model and the anomaly detection model generates an anomaly score of 10 for a first set of telemetry timeseries data, and an anomaly score of five for a second set of telemetry timeseries data, the computer system can detect that the first set of telemetry timeseries data is more anomalous than the second set of telemetry timeseries data previously accessed telemetry timeseries data. Therefore, the computer system can detect telemetry timeseries data that is more anomalous relative to other or previously collected telemetry timeseries data.

Additionally, or alternatively, the computer system can generate an alert to a ground operator at a ground station to prompt investigation of a satellite when an anomaly score for a set of timeseries telemetry data for a longer time-to-failure window (e.g., 36 hours) exceeds a threshold anomaly score of "0", and can also alert the ground operator when an anomaly score for the set of timeseries telemetry data for a shorter time-to-failure window (e.g., 6 hours) exceeds the threshold anomaly score. Thus, the computer system can: access current telemetry data recently broadcast by a particular satellite; detect deviation of these current data from historical telemetry data received from the same and similar satellites (under similar conditions) and on which the computer system is trained; and generate an alert to prompt investigation of these data and the particular satellite.

2.5 Time-To-Failure Analysis

Block S208, S210, and S212 of the second method S200 recite, during a second time period: accessing a first set of timeseries telemetry data broadcast by a first satellite at a first downlink frequency during a current time interval; predicting a first probability of failure of the first satellite within the first time window based on the first model and the first set of timeseries telemetry data; and predicting a second probability of failure of the first satellite within the second time window based on the second model and the first set of timeseries telemetry data.

In one implementation, the computer system can access new downlink data via telemetry streams from a satellite at a particular frequency to predict the probability of events that will cause the satellite to enter investigation mode conditions (e.g., become inoperable) during a time-to-failure window and change system operations in response to failure predictions, in particular time-to-failure windows. More specifically, the computer system can implement the trained time-to-failure models for corresponding time-to-failure windows and, for each time-to-failure window, predict a probability of failure of the satellite in an interval of time. For example, the computer system can: access a first set of timeseries telemetry data broadcast by a first satellite at a first downlink frequency during a current time interval; predict a first probability of failure of the first satellite within the first time window based on the first model and the first set of timeseries telemetry data; and predict a second probability of failure of the first satellite within the second time window based on the second model and the first set of timeseries telemetry data. Therefore, the computer system can forecast probability of failures among satellites based on prior behavior and activity to proactively mitigate satellite failure and damages.

Blocks S214, S216 and S218 of the second method S200 recite, in response to the first probability of failure exceeding a first threshold probability and the second probability of failure falling below the first threshold probability: generating a first command to increase the first downlink frequency and prioritize transmission of telemetry data from the first satellite; and transmitting the first command to the first satellite.

Figure 4:
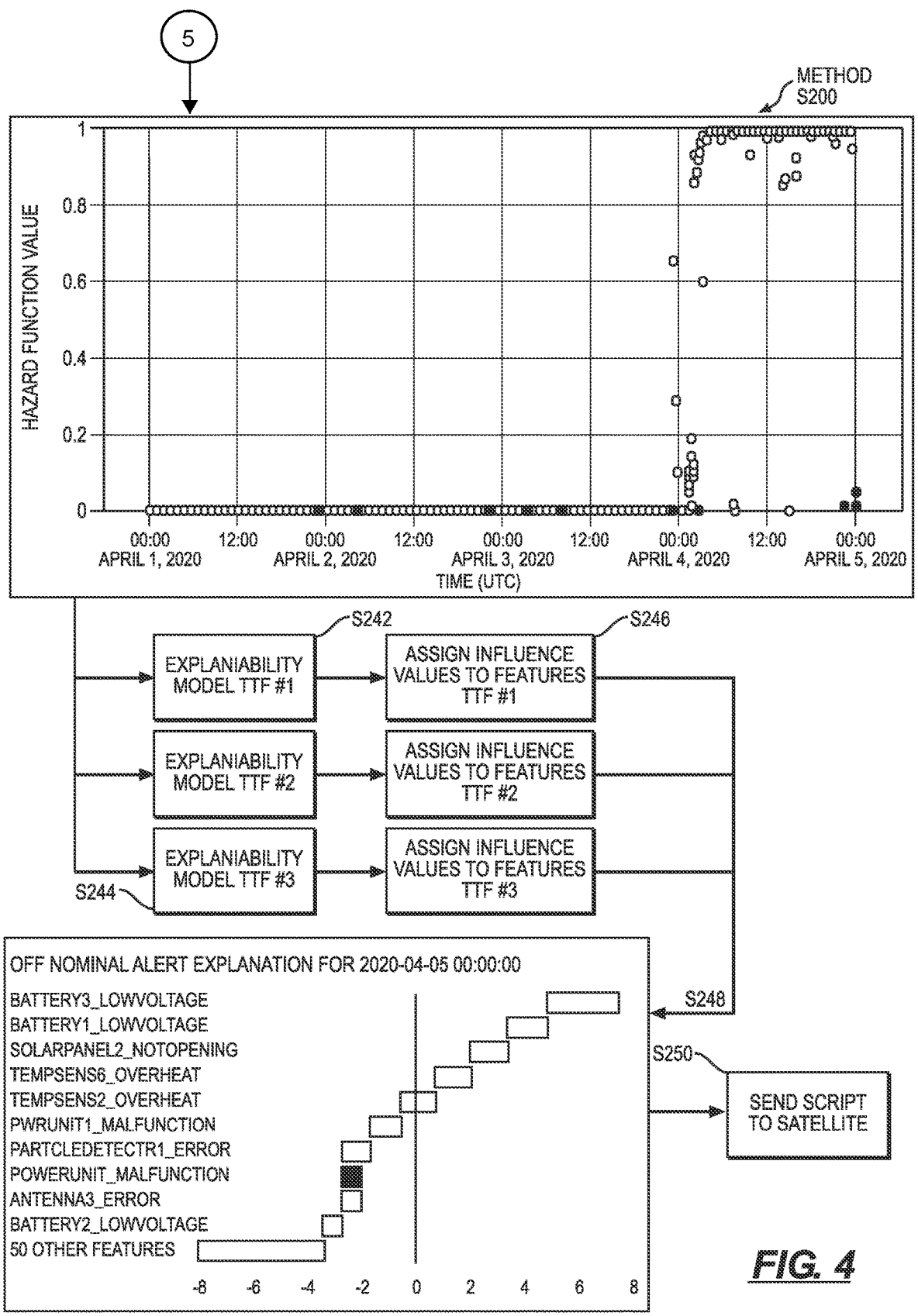
FIG. 4 is a flowchart representation of one variation of the second method.

As shown in FIG. 4, the computer system can send a command to the satellite to prioritize monitoring of the satellite by increasing frequency of downlink data streams when probability of failure during a longer time-to-failure window exceeds a threshold and when probability of failure during the shorter time-to-failure window is in an acceptable, below threshold range. For example, the computer system can, in response to the first probability of failure within the first time window exceeding a first threshold probability and the second probability of failure within the second time window falling below the first threshold probability: generate a first command to increase the first downlink frequency and prioritize transmission of telemetry data from the first satellite; and transmit the first command to the first satellite. Additionally, or alternatively, the computer system can generate a notification and transmit the notification to a computer interface to prompt an operator to change system CONOPS to transfer the satellite to operate in investigation mode operations while the events can be investigated. Therefore, the computer system has an opportunity to avoid a failure of the satellite within the longer time-to-failure window when probability of failure increases by accessing data broadcast by the satellite at a higher frequency.

Blocks S220, S222, and S224 of the second method S200 recite, in response to the first probability of failure falling below a first threshold probability and the second probability of failure exceeding the first threshold probability: detecting an external source of failure of the first satellite; retrieving a script for transferring the first satellite to a safe state; and uploading the script to the first satellite. In one implementation, the computer system can, in response to detecting a higher probability of failure within a shorter time-to-failure window but a lower probability of failure during a longer time-to-failure window, retrieve a script for transferring the satellite to operate in investigation mode conditions and send the script to the satellite. For example, the computer system can: access a first set of timeseries telemetry data broadcast by a first satellite at a first frequency during a current time interval; predict a first probability of failure of the first satellite within the first time window based on the first model and the first set of timeseries telemetry data; predict a second probability of failure of the first satellite within the second time window based on the second model and the first set of timeseries telemetry data; and, in response to the first probability of failure falling below a first threshold probability and the second probability of failure exceeding the first threshold probability: detect an external source of failure of the first satellite, retrieve a script for transferring the first satellite to an investigation mode (e.g., investigation mode), and upload the script to the first satellite. Therefore, the computer system can proceed to identify an occurrence of an unpredicted event such as an external source of failure (e.g., collision with space matter, etc.) when the probability of failure within a shorter time-to-failure window increases suddenly rather than being detected within the longer time-to-failure window. Additionally, or alternatively, the computer system can increase a frequency at which it accesses telemetry data streamed from the satellite when probability of failure in the shorter time-to-failure window increases. For example, in response to the first probability of failure falling below the first threshold probability and the second probability of failure exceeding the first threshold probability the computer system can access a second set of timeseries telemetry data broadcast by the first satellite at a second frequency higher than the first frequency. Therefore, the computer system can monitor the current timeseries telemetry data more frequently when failure in the upcoming time-to-failure window is predicted to initiate mitigation of further damage.

Blocks S226, and S228 of the second method S200 recite, in response to the first probability of failure exceeding a threshold probability and the second probability of failure exceeding the threshold probability: retrieving script for entering an investigation mode; and uploading the script to the first satellite. In one implementation, the computer system can transfer the satellite to operate in investigation mode conditions in response to probabilities of failures for multiple time-to-failure windows exceeding a threshold probability. More specifically, the computer system can retrieve a script containing instructions for transferring the satellite to an investigation mode and upload the script to the satellite to induce investigation mode conditions. For example, the computer system can: access the first set of timeseries telemetry data broadcast by the first satellite at the first downlink frequency during a current time interval; predict the first probability of failure of the first satellite within the first time window based on the first model and the first set of timeseries telemetry data; predict the second probability of failure of the first satellite within the second time window based on the second model and the first set of timeseries telemetry data; and, in response to the first probability of failure exceeding the first threshold probability and the second probability of failure exceeding the first threshold probability, retrieve a script for transferring the first satellite to a an investigation mode, and upload the script to the first satellite. For example, the computer system can predict failure of the satellite in the next 36 hours and the next 6 hours. Therefore, the computer system can mitigate further damage to the satellite by transferring the satellite into investigation mode conditions for a duration of time during which an operator can investigate the failure source.

Block S230 of the second method S200 recites: in response to the first probability of failure falling below the first threshold probability and the second probability of failure falling below the first threshold probability, deprioritizing manual monitoring of the first satellite. For example, the computer system can take no further corrective action with the satellite when probability of failure during both the longer and shorter time-to-failure windows is less than a threshold probability. More specifically, the computer system can prioritize monitoring of failure events of other satellites when probability of failure for a particular satellite is within an acceptable range.

For example, the computer system can: access the first set of timeseries telemetry data broadcast by the first satellite at the first downlink frequency during a current time interval; predict the first probability of failure of the first satellite within the first time window based on the first model and the first set of timeseries telemetry data; predict the second probability of failure of the first satellite within the second time window based on the second model and the first set of timeseries telemetry data; and, in response to the first probability of failure falling below the first threshold probability and the second probability of failure falling below the first threshold probability, deprioritize manual monitoring of the first satellite. Therefore, the computer system can prevent the satellite from entering investigation mode conditions when not necessary and thereby reduce a need for additional computations when no failures are predicted multiple time-to-failure windows.

2.6 Anomaly Detection

Blocks S232, and S234 of the method S200 recite: training a third model to generate a first anomaly score characterizing the timeseries telemetry data within the first time window in Block S236; and training a fourth model to generate a second anomaly score characterizing the timeseries telemetry data within the second time window in Block S238. Generally, the second method S200 can be executed by a computer system to detect anomalies in current timeseries telemetry data based on previous historical data.

In one implementation, the computer system can train a second set of models based on the historical timeseries telemetry data to predict an anomaly score for the timeseries telemetry data broadcast by the satellite. For example, the computer system can identify that timeseries telemetry data transmitted by a satellite is anomalous relative to timeseries telemetry data used to train the anomaly detection models and previously accessed by the satellite. More specifically, if the computer system implements the anomaly detections models and detects timeseries telemetry data as anomalous (e.g., anomaly score of "1"), the timeseries telemetry data is labeled as anomalous absent consideration of time-to-failure windows.

For example, the computer system can: access a first set of timeseries telemetry data broadcast by a first satellite, train an anomaly detection model to generate a first anomaly score characterizing the first set of timeseries telemetry data; and generate a second anomaly score characterizing a second set of timeseries telemetry data. Therefore, the computer system can prompt investigation of the timeseries telemetry data when the computer system identified that the timeseries telemetry data is anomalous relative to previously collected data.

Additionally or alternatively, the computer system can train a second set of models based on the historical timeseries telemetry data and the timeseries failure data to predict an anomaly score for the timeseries telemetry data broadcast by the satellite during each time-to-failure window. For example, the computer system can, train a third model to, generate a first anomaly score characterizing the first historical timeseries telemetry data and first timeseries failure data within the first time window; and generate a second anomaly score characterizing the first historical timeseries telemetry data and first timeseries failure data within the second time window.

Generally, block S240 can be executed by the computer system to implement the second set of models to detect presence of anomalous data in the timeseries telemetry data broadcast by the satellite. For example, the computer system can implement the anomaly detection models to characterize (e.g., quantify) deviation of the timeseries telemetry data (e.g., each telemetry data point) from the historical timeseries telemetry data implemented to train the model. For example, the computer system can characterize telemetry time series data as nominal or anomalous based on a binary indicator (e.g., "0" or "1"). For example, the computer system can identify that telemetry time series data is nominal when the anomaly detection model generates an anomaly score of "0" and label the data with a first indicator. Furthermore, the computer system can identify that telemetry time series data is anomalous when the anomaly detection model generates an anomaly score of "1" and label the data with a second indicator. More specifically, when the computer system labels the data as anomalous, the computer system can notify a ground station to prompt investigation of the incoming data from the satellite and increase downlink frequency of data from the satellite.

Additionally, or alternatively, the computer system can assign an anomaly score between "0" (e.g., normal, nominal) and "1" (e.g., anomalous) for each timeseries telemetry data accessed. For example, the computer system can predict an anomaly score of 0.2 for the timeseries telemetry data of a longer time-to-failure window and an anomaly score of 0.7 for the shorter time-to-failure window, indicating that a set of timeseries telemetry data broadcast by the satellite does not resemble historical timeseries telemetry data previously implemented to train the anomaly detection model.

For example, the computer system can, in response to an anomaly score exceeding a threshold anomaly score, characterize the first set of timeseries telemetry data (e.g., for the first time window) as anomalous; in response to the anomaly score falling below the threshold anomaly score, characterize the first set of timeseries telemetry data (e.g., for the second time window) as nominal; and generate a command to characterize the first set of timeseries telemetry data window as anomalous. Therefore, the computer system can detect when current timeseries telemetry data broadcast by the satellite is anomalous relative to previous data to trigger investigation by an operator.

2.7 Failure Explainability & Feature Ranking

Generally, blocks S242, S244, and S246 of the second method S200 can be executed by a computer system to implement a set of explainability models to identify a set of features contributing to the failure based on the results generated by the hazard function and anomaly detection models and assign influence values to the set of features. As shown in FIG. 4, the computer system can implement the set of explainability models for each time-to-failure window based on influence values or Shapley values associated with features of the satellite specifying a degree of influence of the feature contributing to the failure of the satellite. More specifically, the computer system can implement the set of explainability models to generate influence values for each feature and assign the influence values to corresponding features. For example, the larger an influence value (e.g., SHAPLEY value) assigned to a feature (e.g., a power system, a solar panel, etc.), the larger attribution the feature has on the predicted failure. In contrast, the smaller the influence value assigned to the future, the smaller the attribution of the feature to the predicted failure. Additionally, or alternatively the computer system can identify a set of lowest contributing influence values corresponding to a set of lowest influencing features and sum of the influence values and sum of the influence values. Therefore, the computer system can detect which features of the satellite are not priority for further investigation until the influence values change (e.g., increase) over time or during a time-to-failure window.

For example, the computer system can: assign a first influence value to a first feature associated with a first subsystem of the first satellite contributing to a failure of the first satellite during the first time window based on the first and third model; and assign a second influence value to a second feature associated with a second subsystem of the first satellite contributing to the failure of the first satellite during the second time window based on the first and third model, the second influence value lower than the first influence value based on the second and fourth model. Therefore, the computer system can identify a set of features that contribute most to the satellite failure to trigger investigation of the highest contributing features.

Generally, block S248 the second method S200 can be executed by a computer system to rank the set of features based on the influence values. In one implementation, the computer system can rank the set of features contributing most to the failure (e.g., top ten features) based on the influence values (e.g., from greatest influence value to smallest influence value). For example, the computer system can rank the first and second feature for investigation based on the first influence value and the second influence value. Therefore, the computer system can prioritize mitigation of failure of the assets or features contributing most to the failure during a particular time-to-failure window.

In one implementation, the computer system can assign influence values for a set of features during a longer time-to-failure window (e.g., 36 hour) that are different for the set of features during a shorter time-to-failure window (e.g., 6 hour). More specifically, features of the satellite contributing to a failure during a first time-to-failure window can be different or have different attributions to the failure during a second time-to-failure window. For example, a feature can have a smaller contribution to the satellite failure during a longer time-to-failure window but based on the hazard function and anomaly detection models, have an increased contribution to the failure during the shorter time-to-failure window if the feature has an increased rate of failure. Therefore, the computer system can detect changes in performance of the satellite based on the current time series telemetry data to modify influence values of failure for prioritization of failure mitigation for each feature during shorter time-to-failure windows.

2.7.1 Feature Space Analysis

Additionally, or alternatively, the second method S200 can be executed by a computer system to implement a feature space to predict a source of a probability of failure of the satellite by grouping timeseries telemetry data into telemetry containers. The computer system can implement an n-dimensional feature space to map telemetry timeseries data, and, based on spatial differences in the data, identify timeseries data that is anomalous relative to other telemetry timeseries data during a discrete time window and predict probabilities of intervention mode operations.

For example, the computer system can predict a source of a probability of failure by: accessing historical telemetry data, in a set of telemetry domains, for the satellite; grouping telemetry data into a set of historical telemetry containers, each telemetry container associated with a discrete historical time window and containing values representing the set of telemetry domains; populating a current telemetry container with current telemetry data; characterizing the current telemetry container as anomalous, in a particular telemetry domain in the set of telemetry domains, based on distances between the current telemetry container and the set of historical telemetry containers in a feature space; and identifying the source of the second probability of failure, within the second time window, based on the particular telemetry domain.

In one implementation, the computer system can implement a feature space to rank features contributing to the failure based on anomaly scores. For example, the computer system can: access a second set of timeseries telemetry data broadcast by a first satellite; predict a third probability of failure of the first satellite within the second time window based on the first model and the second set of timeseries telemetry data; and predict a fourth probability of failure of the first satellite within the fourth time window based on the second model and the second set of timeseries telemetry data. The computer system can, in response to the third probability of failure exceeding the threshold probability and the fourth probability of failure exceeding the threshold probability: access a set of historical telemetry data, in a set of telemetry domains, for a first satellite; group the set of historical telemetry data into a set of historical telemetry containers, each telemetry container associated with a discrete historical time window and containing values representing the set of telemetry domains; and populate a current telemetry container with the second set of timeseries telemetry data. The computer system can further, for each telemetry domain in the set of telemetry domains: calculate an anomaly score for the telemetry domain in the current telemetry container based on distances between the current telemetry container and the set of historical telemetry containers in a feature space; and, within a user portal, rank the set of telemetry domains for investigation at the first satellite based on anomaly scores of telemetry domains in the current telemetry container. Therefore, the computer system can implement a feature space rather that Shapley value analysis to rank feature of the satellite.

2.8 Response to Failure

Generally, block 250 of the second method S200 can be executed by the computer system to send a command or script to the satellite to correct or power down a set of features associated with the highest influence value. More specifically, the computer system can, in response to detecting a probability of failure of the satellite exceeding a threshold probability and classifying current time series telemetry data as anomalous during a time-to-failure window, implement the feature explainability model to identify and rank the features contributing to the failure. The computer system can then send a script to the satellite to transfer the satellite into performing in investigation mode conditions and send a command specific to each feature to the satellite to respond to each feature. For example, the computer system can generate a first command to increase the first downlink frequency and prioritize transmission of telemetry data from the first satellite; generate the first command to respond to the first feature of the first satellite; and generate a second command to respond to a second feature of the first satellite. Therefore, the computer system can identify features contributing most to the failure of the satellite and respond by transferring the satellite into investigation mode conditions to prompt mitigation or resolution of each feature and the failure.

Additionally, or alternatively, the computer system can generate a notification to prompt an operator to alter system operations and reconfigure system CONOPS to transfer the satellite to operate in investigation mode operations while the events can be investigated. For example, the computer system can generate and transmit notifications to a computer system interface at the ground station to prompt the operator to initiate investigation mode conditions.

2.9 Satellite Specific Models

In one implementation, the computer system can train and implement the hazard function, anomaly detection, and feature explainability models unique to a make and model of a satellite of the population of satellites or unique to a manufacturer of the satellite. For example, the computer system can: train a first set of models associated with a first satellite model type of the first population of satellites to rank first features for investigation of the first satellite, the first satellite of the first satellite model type; and train a second set of models associated with a second satellite model type of the first population of satellites to rank second features for investigation of a second satellite, the second satellite of a second satellite model type. Therefore, the computer system can implement the set of models to generate predictions and results, such as anomaly detection, based on performance parameters inherent to those satellite types and models.

Additionally or alternatively, the computer system can: access historical timeseries telemetry data and timeseries failure for the population of satellites; aggregate the historical timeseries telemetry data and historical timeseries failure data across the population of satellites; and train the hazard function, and anomaly detection models with the aggregated historical timeseries telemetry data and timeseries failure data for each time-to-failure window.

2.10 Incremental Model Training

In one implementation, the computer system can incrementally train the hazard function, and anomaly detection models and update the models after an interval of time (e.g., every 24 hours) with the timeseries telemetry data accessed during the interval of time. For example, the computer system can: update the first model based on the second set of timeseries telemetry data broadcast by the first satellite after a first time interval to predict a third probability of failure within the first time window; and update the second model based on the second set of timeseries telemetry data broadcast by the first satellite after the first time interval to predict a fourth probability of failure within the second time window. Therefore, the computer system can reduce time and cost associated with processing the timeseries telemetry data previously accessed but updates the already trained models with newly received data. Additionally or alternatively the computer system can retrain the hazard function and anomaly detection models after the interval of time based on historical timeseries telemetry data and new timeseries telemetry data after an interval of time. Therefore, the computer system can periodically update the set of models based on current data broadcast by the satellite.

In one implementation, the computer system can update the hazard function and anomaly detection models with current timeseries telemetry data in response to increasing a downlink frequency when the computer system predicts a probability of failure exceeding a threshold probability. For example, the computer system can: retrain the first model based on the second set of timeseries telemetry data broadcast by the first satellite at a second frequency higher than the first frequency, to predict a third probability of failure within the first time window; and retrain the second model based on the second set of timeseries telemetry data broadcast by the first satellite at the second frequency to predict a fourth probability of failure within the second time window. Additionally or alternatively, the computer system can retrain the hazard function and anomaly detection models with historical time series telemetry data and ground testing data associated with a new satellite when the new satellite is deployed. Therefore, the computer system can implement a larger data set for future predictions of failure and anomaly detection when the computer system identifies events that necessitate entry into investigation mode conditions.

2.11 Anchor Time

In one implementation, the computer system can define an anchor time for the time-to-failure windows when the hazard function model predicts a probability of failure exceeding a threshold probability for a duration of time. For example, the computer system can access timeseries telemetry data from the satellite once every 6 hours. When the computer system detects a probability of failure exceeding a threshold of 0.5 for a period of time (e.g., for a minute) based on the current timeseries telemetry data, the computer system can set that time as an anchor time for reference for future activity for each of the time-to-failure windows. For example, the computer system can: define an anchor time specifying a start point for the first and second time windows based on a probability of failure exceeding the threshold probability for a duration of time; and accessing the first set of timeseries telemetry data broadcast by the first satellite based on the anchor time. Therefore, the computer system can implement the anchor time as a reference point for subsequent timeseries telemetry data and failure analysis.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

The method s described herein as executed by a computer system predict a lifespan for active/deployed satellites; however, the computer system can similarly execute blocks of the method to predict a lifespan of other hardware systems, such as: commercial/industrial generators, commercial air conditioning (AC) systems, oil rigs, gas pipelines, jet aircrafts, and/or commercial and passenger road vehicles.

As a person skilled in the art will recognize from the previous detailed description and from the figures and claims, modifications and changes can be made to the embodiments of the invention without departing from the scope of this invention as defined in the following claims.

We claim:
1. A method comprising:
   during a first time period:
      accessing a first set of telemetry data for a first population of satellites;
      training a first model to predict failures for the first population of satellites within a first time window based on the first set of telemetry data; and
      training a second model to predict failures for the first population of satellites within a second time window, shorter than the first time window, based on the first set of telemetry data; and
   during a second time period:
      accessing a second set of telemetry data broadcast by a first satellite;
      predicting a first probability of failure of the first satellite within the first time window based on the first model and the second set of telemetry data;
      predicting a second probability of failure of the first satellite within the second time window based on the second model and the second set of telemetry data; and
      in response to the first probability of failure exceeding a first threshold probability and the second probability of failure falling below the first threshold probability, triggering prioritizing of telemetry data transmission from the first satellite.

2. The method of claim 1, wherein triggering prioritizing of telemetry data transmission from the first satellite comprises:
   in response to the first probability of failure exceeding a first threshold probability and the second probability of failure falling below the first threshold probability:
      generating a notification for an operator to alter a set of operations to prioritize transmission of telemetry data from the first satellite; and
      transmitting the notification to the operator.

3. The method of claim 2:
   further comprising, during the first time period:
      training a third model to generate a first anomaly score characterizing the first set of telemetry data within the first time window; and
   further comprising, during the second time period:
      in response to the first anomaly score exceeding a first threshold anomaly score, characterizing the second set of telemetry data for the first time window as anomalous; and
   wherein generating the notification comprises generating the notification in response to characterizing the second set of telemetry data for the first time window as anomalous.

4. The method of claim 3, wherein generating the notification in response to characterizing the second set of telemetry data for the first time window as anomalous comprises generating the notification to prompt the operator to initiate investigation mode conditions.

5. The method of claim 3:
further comprising, during the first time period:
training a fourth model to generate a second anomaly score characterizing the first timeseries telemetry data within the second time window; and
further comprising, during a third time period:
assigning a first influence value to a first feature associated with a first subsystem of the first satellite contributing to a failure of the first satellite based on the first and third model;
assigning a second influence value to a second feature associated with a second subsystem of the first satellite contributing to the failure of the first satellite based on the first and third model, the second influence value lower than the first influence value based on the second and fourth model; and
ranking the first and second feature according to the first influence value and the second influence value.

6. The method of claim 5, wherein ranking the first and second features comprises ranking the first and second features based on values associated with each of the first and second features, the values assigned by a feature model.

7. The method of claim 6, wherein ranking the first and second features comprises ranking the first and second features for investigation based on Shapley values associated with each of the first and second features, the Shapley values assigned by a feature model.

8. The method of claim 5:
wherein generating the notification for the operator to alter the set of operations comprises generating the notification to respond to the first subsystem of the first satellite; and
further comprising generating a second notification to respond to the second subsystem of the first satellite.

9. The method of claim 2, further comprising, during the second time period:
in response to the first probability of failure falling below the first threshold probability and the second probability of failure falling below the first threshold probability:
generating the notification for the operator to alter the set of operations to deprioritize manual monitoring of the first satellite; and
transmitting the notification to the operator.

10. The method of claim 2, further comprising, during the second time period for the first satellite:
in response to the first probability of failure exceeding the first threshold probability and the second probability of failure exceeding the first threshold probability:
generating the notification for the operator to alter the set of operations to:
retrieve a script for transferring the first satellite to a safe state; and
prompt upload of the script to the first satellite; and
transmitting the notification to an operator.

11. The method of claim 1:
further comprising, defining a reference time specifying a start point for the first and second time windows based on a probability of failure exceeding the threshold probability for a duration of time; and
wherein accessing the second set of telemetry data broadcast by the first satellite comprises accessing the second set of telemetry data broadcast by the first satellite based on the reference time.

12. The method of claim 1:
during the first time period:
wherein accessing the first set of telemetry data comprises accessing the first set of telemetry data and a first set of failure data for a first population of satellites;
wherein training the first model comprises training the first model to predict failures for the first population of satellites within the first time window based on the first set of telemetry data and the first set of failure data; and
wherein training the second model comprises training the second model to predict failures for the first population of satellites within the second time window, shorter than the first time window, based on the first set of telemetry data and the first set of failure data.

13. A method comprising:
during a first time period:
accessing a first set of telemetry data and a first set of failure data for a first population of satellites;
training a first model to predict a failure of a first satellite of the first population of satellites within a first time window based on the first telemetry data and the first failure data; and
training a second model to predict the failure within a second time window, shorter than the first time window, based on the first telemetry data and first failure data; and
during a second time period:
accessing a second set of telemetry data broadcast by a first satellite;
predicting a first probability of failure of the first satellite within the first time window based on the first model and the second set of telemetry data;
predicting a second probability of failure of the first satellite within the second time window based on the second model and the second set of telemetry data; and
in response to the first probability of failure falling below a first threshold probability and the second probability of failure exceeding the first threshold probability, triggering alteration of a set of operations to:
detect an external source of failure of the first satellite;
retrieve a script for transferring the first satellite to a safe state; and
upload the script to the first satellite.

14. The method of claim 13:
during the first time period:
wherein accessing the first set of telemetry data and a first set of failure data comprises accessing a first set of historical timeseries telemetry data and a first set of historical timeseries failure data for a first population of satellites, the first set of historical timeseries telemetry data including labeled times stamps specifying instances when the first satellite entered into investigation mode conditions; and
during the second time period:
wherein accessing the second set of telemetry data comprises accessing a first set of timeseries telemetry data broadcast by the first satellite.

15. The method of claim 13:
further comprising, during the first time period:
   training a third model to predict a first anomaly score characterizing the first telemetry data and the first failure data within the first time window; and
further comprising, during the second time period for the first satellite:
   in response to the first anomaly score falling below a first threshold anomaly score, characterizing the second set of telemetry data for the first time window as nominal.

16. The method of claim 13, wherein triggering alteration of the set of operations comprises:
in response to the first probability of failure falling below a first threshold probability and the second probability of failure exceeding the first threshold probability:
   generating a notification for an operator to alter a set of operations to:
      detect an external source of failure of the first satellite;
      retrieve a script for transferring the first satellite to a safe state; and
      upload the script to the first satellite; and
   transmitting the notification to the operator.

17. The method of claim 16:
further comprising, during the first time period:
   training a fourth model to predict a second anomaly score characterizing the first telemetry data and the first failure data within the second time window;
further comprising, during the second time period:
   in response to the second anomaly score exceeding the first threshold anomaly score, characterizing the second set of telemetry data for the second time window as anomalous; and
wherein generating the notification for the operator to alter the set of operations comprises generating the notification characterizing the second set of telemetry data for the second time window as anomalous.

18. The method of claim 13:
during the second time period:
   wherein accessing the second set of telemetry data comprises accessing the second set of telemetry data broadcast by a first satellite at a first frequency; and
   wherein in response to the first probability of failure falling below the first threshold probability and the second probability of failure exceeding the first threshold probability comprises accessing a second set of telemetry data broadcast by the first satellite at a second frequency higher than the first frequency.

19. A method comprising:
during a first time period:
   accessing a first set of telemetry data and a first set of failure data for a first population of satellites;
   training a first model to predict a failure of a first satellite of the first population of satellites within a first time window based on the first set of telemetry data and the first set of failure data; and
   training a second model to predict the failure within a second time window, shorter than the first time window, based on the first set of telemetry data and the first set of failure data; and
during a second time period:
   accessing a second set of telemetry data broadcast by a first satellite;
   predicting a first probability of failure of the first satellite within the first time window based on the first model and the second set of telemetry data;
   predicting a second probability of failure of the first satellite within the second time window based on the second model and the second set of telemetry data; and
   in response to the first probability of failure exceeding a threshold probability and the second probability of failure exceeding the threshold probability, triggering alteration of a set of operations to:
      retrieve a script for entering a safe state for the first satellite; and
      upload the script to the first satellite.

20. The method of claim 19, wherein triggering alteration of a set of operations comprises:
in response to the first probability of failure exceeding a threshold probability and the second probability of failure exceeding the threshold probability:
   generating a notification for an operator to alter a set of operations to:
      retrieve a script for entering a safe state for the first satellite; and
      upload the script to the first satellite; and
   transmitting the notification to the operator.

* * * * *